(12) United States Patent
Sato et al.

(10) Patent No.: US 11,581,574 B2
(45) Date of Patent: Feb. 14, 2023

(54) ALL SOLID BATTERY AND MANUFACTURING METHOD OF THE SAME

(71) Applicant: TAIYO YUDEN CO., LTD., Tokyo (JP)

(72) Inventors: Takato Sato, Tokyo (JP); Daigo Ito, Tokyo (JP); Sachie Tomizawa, Tokyo (JP); Chie Kawamura, Tokyo (JP); Masashi Sekiguchi, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 233 days.

(21) Appl. No.: 17/105,071

(22) Filed: Nov. 25, 2020

(65) Prior Publication Data

US 2021/0202985 A1    Jul. 1, 2021

(30) Foreign Application Priority Data

Dec. 27, 2019  (JP) .............................. JP2019-238340

(51) Int. Cl.
*H01M 10/0562* (2010.01)
*H01M 4/36* (2006.01)
*H01M 10/0525* (2010.01)
*H01M 10/0585* (2010.01)

(52) U.S. Cl.
CPC ....... *H01M 10/0562* (2013.01); *H01M 4/366* (2013.01); *H01M 10/0525* (2013.01); *H01M 10/0585* (2013.01)

(58) Field of Classification Search
CPC ......... H01M 10/0562; H01M 10/0525; H01M 10/0585; H01M 4/366
See application file for complete search history.

(56) References Cited

U.S. PATENT DOCUMENTS

| | | | |
|---|---|---|---|
| 2014/0134483 A1* | 5/2014 | Ouchi ................... | H01M 6/188 429/209 |
| 2018/0115016 A1 | 4/2018 | Ito et al. ........... | H01M 10/0525 |

FOREIGN PATENT DOCUMENTS

| | | | | |
|---|---|---|---|---|
| EP | 1826861 A1 * | 8/2007 | ........ | H01M 10/0562 |
| JP | 2018-073554 A | 5/2018 | | |

* cited by examiner

*Primary Examiner* — Matthew J Merkling
(74) *Attorney, Agent, or Firm* — Stein IP, LLC

(57) ABSTRACT

An all solid battery includes a solid electrolyte layer of which a main component is a $Li-Al-M-PO_4$-based phosphoric acid salt, a first electrode layer that is provided on a first main face of the solid electrolyte layer and includes an active material, and a second electrode layer that is provided on a second main face of the solid electrolyte layer and includes an active material. "M" is at least one of Ge, Ti, and Zr. A region in which a ratio of $MO_2$ with respect to $Li-Al-M-PO_4$ is 5% or more is unevenly distributed from a center in a thickness of the solid electrolyte layer to 0.4 A downward and to 0.4 A upward, when the thickness of the solid electrolyte layer is expressed by "A".

4 Claims, 6 Drawing Sheets

ALL SOLID BATTERY AND MANUFACTURING METHOD OF THE SAME

CROSS-REFERENCE TO RELATED APPLICATION

This application is based upon and claims the benefit of priority of the prior Japanese Patent Application No. 2019-238340, filed on Dec. 27, 2019, the entire contents of which are incorporated herein by reference.

FIELD

A certain aspect of the present invention relates to an all solid battery and a manufacturing method of the all solid battery.

BACKGROUND

High ionic conductivity can be achieved by using phosphoric acid salt having a NASICON structure, as solid electrolyte layers of an all solid battery. The phosphoric acid salt is such as Li—Al-M-$PO_4$-based phosphoric acid salt ("M" is such as Ge, Ti, or Zr) (for example, see Japanese Patent Application Publication No. 2018-73554).

SUMMARY OF THE INVENTION

However, in the solid electrolyte layers, $MO_2$, an oxide of "M", may diffuse into electrode layers. When $MO_2$ diffuses into the electrode layers, a composition of the Li—Al-M-$PO_4$-based phosphoric acid salt may fluctuate. And, the high ionic conductivity may not be necessarily achieved. $MO_2$ does not ionic conductivity. When $MO_2$ exists near interfaces between the solid electrolyte layers and the electrode layers because of the diffusion, the number of ion conduction paths decreases. Therefore, the high ionic conductivity may not be necessarily achieved.

According to an aspect of the present invention, there is provided an all solid battery including: a solid electrolyte layer of which a main component is a Li—Al-M-$PO_4$-based phosphoric acid salt; a first electrode layer that is provided on a first main face of the solid electrolyte layer and includes an active material; and a second electrode layer that is provided on a second main face of the solid electrolyte layer and includes an active material, wherein "M" is at least one of Ge, Ti, and Zr, wherein a region in which a ratio of $MO_2$ with respect to Li—Al-M-$PO_4$ is 5% or more is unevenly distributed from a center in a thickness of the solid electrolyte layer to 0.4 A downward and to 0.4 A upward, when the thickness of the solid electrolyte layer is expressed by "A".

According to another aspect of the present invention, there is provided a manufacturing method of an all solid battery including: preparing a multilayer structure in which a paste for a first electrode layer including an active material is provided on a first main face of a green sheet including Li—Al-M-$PO_4$-based phosphoric acid salt powder, and a paste for a second electrode layer including an active material is provided on a second main face of the green sheet; and firing the multilayer structure, wherein "M" is at least one of Ge, Ti and Zr, wherein a region in which a ratio of $MO_2$ with respect to Li—Al-M-$PO_4$ is 5% or more is unevenly distributed from a center in a thickness of a solid electrolyte layer formed by firing the green sheet to 0.4 A downward and to 0.4 A upward when the thickness of the solid electrolyte layer is expressed by "A", by adding $MO_2$ particles in the green sheet and adjusting a condition of the firing.

DETAILED DESCRIPTION

A description will be given of an embodiment with reference to the accompanying drawings.

Figure 1:
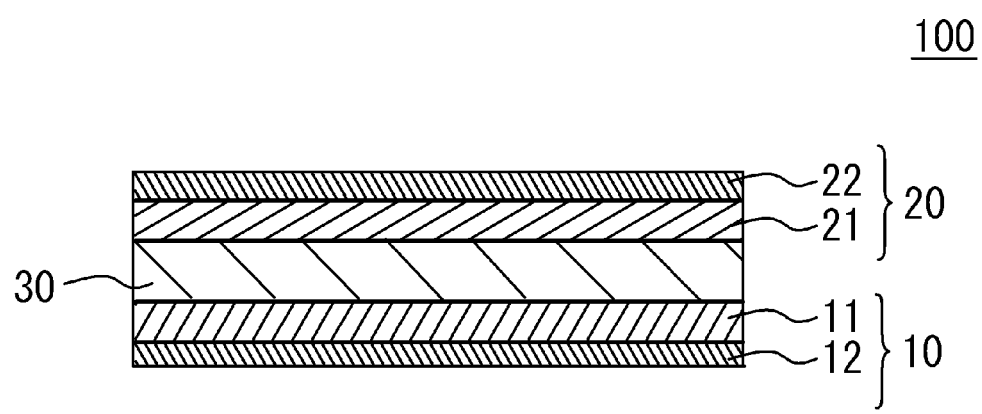
FIG. 1 illustrates a schematic cross section of a basic structure of an all solid battery.

(Embodiment) FIG. 1 illustrates a schematic cross section of a basic structure of an all solid battery 100 in accordance with an embodiment. As illustrated in FIG. 1, the all solid battery 100 has a structure in which a first internal electrode 10 and a second internal electrode 20 sandwich a solid electrolyte layer 30. The first internal electrode 10 is provided on a first main face of the solid electrolyte layer 30. The first internal electrode 10 has a structure in which a first internal electrode layer 11 and a first electric collector layer 12 are stacked. The first internal electrode layer 11 is on the solid electrolyte layer 30 side. The second internal electrode 20 is provided on a second main face of the solid electrolyte layer 30. The second internal electrode 20 has a structure in which a second internal electrode layer 21 and a second electric collector layer 22 are stacked. The second internal electrode layer 21 is on the solid electrolyte layer 30 side.

When the all solid battery 100 is used as a secondary battery, one of the first internal electrode 10 and the second internal electrode 20 is used as a positive electrode and the other is used as a negative electrode. In the embodiment, as an example, the first internal electrode 10 is used as a positive electrode, and the second internal electrode 20 is used as a negative electrode.

A main component of the solid electrolyte layer 30 is phosphoric acid salt-based solid electrolyte having a NASICON structure. The phosphoric acid salt-based solid electrolyte having the NASICON structure has a high conductivity and is stable in normal atmosphere. The phosphoric acid salt-based solid electrolyte is, for example, such as a salt of phosphoric acid including lithium. The phosphoric acid salt is not limited. For example, the phosphoric acid salt is such as composite salt of phosphoric acid with Ti (for example $LiTi_2(PO_4)_3$). In order to increase an amount of Li, a part of Ti may be replaced with a transition metal of which a valence is three, such as Al, Ga, In, Y or La. In concrete, the phosphoric acid salt including lithium and having the NASICON structure is $Li_{1+x}Al_xGe_{2-x}(PO_4)_3$, $Li_{1+x}Al_xZr_{2-x}(PO_4)_3$, $Li_{1+x}Al_xT_{2-x}(PO_4)_3$ or the like. For example, it is preferable that Li—Al—Ge—$PO_4$-based material, to which a transition metal included in the phosphoric acid salt having the olivine type crystal structure included in the first internal electrode layer 11 and the second internal electrode layer 21 is added in advance, is used. For example, when the first internal electrode layer 11 and the second internal electrode layer 21 include phosphoric acid salt including Co and Li, it is preferable that the solid electrolyte layer 30 includes Li—Al—Ge—PO$_4$-based material to which Co is added in advance. In this case, it is possible to suppress solving of the transition metal included in the electrode active material into the electrolyte. When the first internal electrode layer 11 and the second internal electrode layer 21 include phosphoric acid salt including Li and a transition metal other than Co, it is preferable that the solid electrolyte layer 30 includes Li—Al—Ge—PO$_4$-based material in which the transition metal is added in advance.

At least, the first internal electrode layer 11 used as a positive electrode includes a material having an olivine type crystal structure, as an electrode active material. It is preferable that the second internal electrode layer 21 also includes the electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, LiCoPO$_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or PO$_4$ may fluctuate in accordance with a valence. It is preferable that Co, Mn, Fe, Ni or the like is used as the transition metal.

The electrode active material having the olivine type crystal structure acts as a positive electrode active material in the first internal electrode layer 11 acting as a positive electrode. For example, when only the first internal electrode layer 11 includes the electrode active material having the olivine type crystal structure, the electrode active material acts as the positive electrode active material. When the second internal electrode layer 21 also includes an electrode active material having the olivine type crystal structure, discharge capacity may increase and an operation voltage may increase because of electric discharge, in the second internal electrode layer 21 acting as a negative electrode. The function mechanism is not completely clear. However, the mechanism may be caused by partial solid-phase formation together with the negative electrode active material.

When both the first internal electrode layer 11 and the second internal electrode layer 21 include an electrode active material having the olivine type crystal structure, the electrode active material of each of the first internal electrode layer 11 and the second internal electrode layer 21 may have a common transition metal. Alternatively, the a transition metal of the electrode active material of the first internal electrode layer 11 may be different from that of the second internal electrode layer 21. The first internal electrode layer 11 and the second internal electrode layer 21 may have only single type of transition metal. The first internal electrode layer 11 and the second internal electrode layer 21 may have two or more types of transition metal. It is preferable that the first internal electrode layer 11 and the second internal electrode layer 21 have a common transition metal. It is more preferable that the electrode active materials of the both electrode layers have the same chemical composition. When the first internal electrode layer 11 and the second internal electrode layer 21 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The second internal electrode layer 21 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the second internal electrode layer 21. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid salt, a carbon, a vanadium lithium phosphate.

In the forming process of the first internal electrode layer 11 and the second internal electrode layer 21, moreover, oxide-based solid electrolyte material or a conductive material (conductive auxiliary agent) such as a carbon material or a metal material may be added. When the material is evenly dispersed into water or organic solution together with binder or plasticizer, paste for electrode layer is obtained. Pd, Ni, Cu, or Fe, or an alloy thereof may be used as a metal of the conductive auxiliary agent.

A main component of the first electric collector layer 12 and the second electric collector layer 22 is conductive material.

Figure 2:
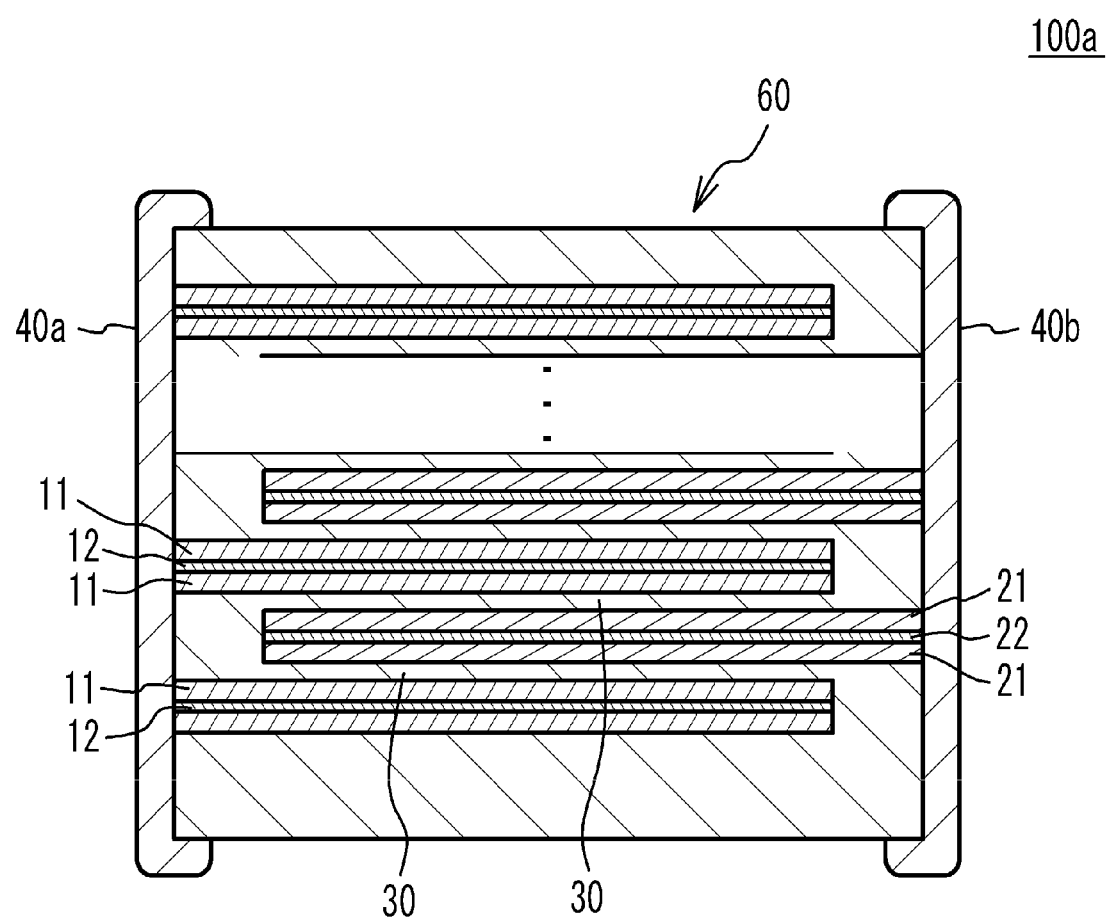
FIG. 2 illustrates a schematic cross section of another all solid battery.

FIG. 2 illustrates a schematic cross section of an all solid battery 100a in which a plurality of cell units are stacked. The all solid battery 100a has a multilayer chip 60 having a rectangular parallelepiped shape. The all solid battery 100a has a first external electrode 40a formed on a first end face of the multilayer chip 60 and a second external electrode 40b formed on a second end face facing with the first end face.

In four faces other than the two end faces of the multilayer chip 60, two faces other than an upper face and a lower face of the multilayer chip 60 in a stacking direction are referred to as side faces. The first external electrodes 40a and the second external electrode 40b extend to the upper face, the lower face and the two side faces of the multilayer chip 60. However, the first external electrode 40a and the second external electrode 40b are spaced from each other.

In the following description, the same numeral is added to each member that has the same composition range, the same thickness range and the same particle distribution range as that of the all solid battery 100. And, a detail explanation of the same member is omitted.

In the all solid battery 100a, each of the first electric collector layers 12 and each of the second electric collector layers 22 are alternately stacked. Edges of the first electric collector layers 12 are exposed to the first edge face of the multilayer chip 60 but are not exposed to the second edge face of the multilayer chip 60. Edges of the second electric collector layers 22 are exposed to the second edge face of the multilayer chip 60 but are not exposed to the first edge face. Thus, each of the first electric collector layers 12 and each of the second electric collector layers 22 are alternately conducted to the first external electrode 40a and the second external electrode 40b.

The first internal electrode layer 11 is stacked on the first electric collector layer 12. The solid electrolyte layer 30 is stacked on the first internal electrode layer 11. The solid electrolyte layer 30 extends from the first external electrode 40a to the second external electrode 40b. The second internal electrode layer 21 is stacked on the solid electrolyte layer 30. The second electric collector layer 22 is stacked on the second internal electrode layer 21. Another second internal electrode layer 21 is stacked on the second electric collector layer 22. Another solid electrolyte layer 30 is stacked on the second internal electrode layer 21. The solid electrolyte layer 30 extends from the first external electrode 40a to the second external electrode 40b. The first internal electrode layer 11 is stacked on the solid electrolyte layer 30. In the all solid battery 100a, the stack units are repeatedly stacked. Therefore, the all solid battery 100a has a structure in which a plurality of cell units are stacked.

In the all solid battery 100 and the all solid battery 100a, the composition of the Li-AL-M-PO$_4$-based phosphoric acid salt of the solid electrolyte layer 30 may fluctuate. In concrete, "M" of the Li—Al-M-PO$_4$-based phosphoric acid salt may diffuse toward the first internal electrode layer 11 side and the second internal electrode layer 21 side.

Figure 3A:
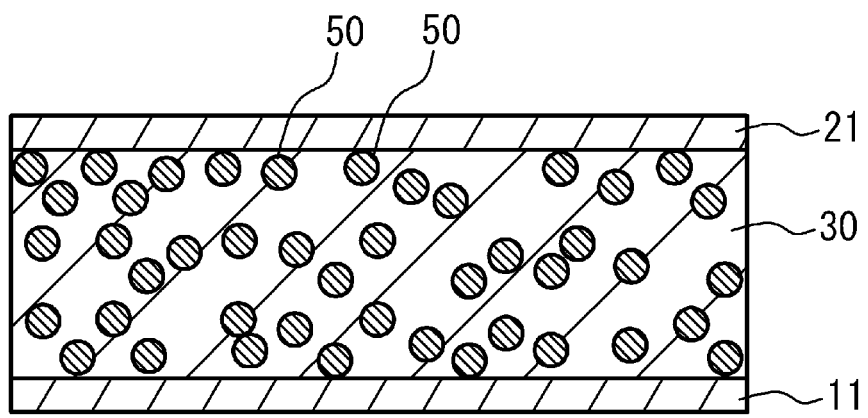
FIG. 3A to FIG. 3C illustrate cross sectional views of a solid electrolyte layer, a first electrode layer adjacent to the solid electrolyte layer and a second electrode layer adjacent to the solid electrolyte layer.
Figure 3B:
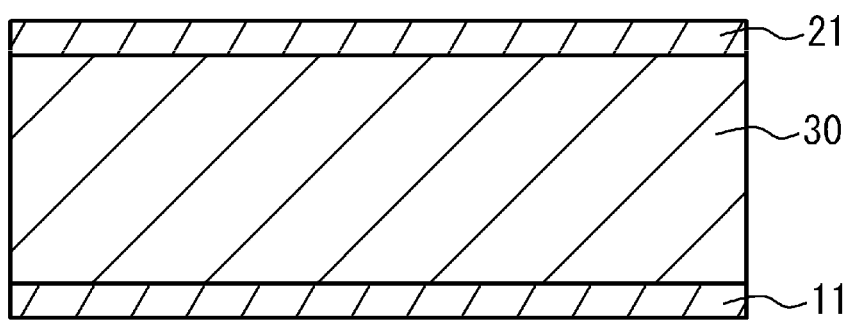
Figure 3C:
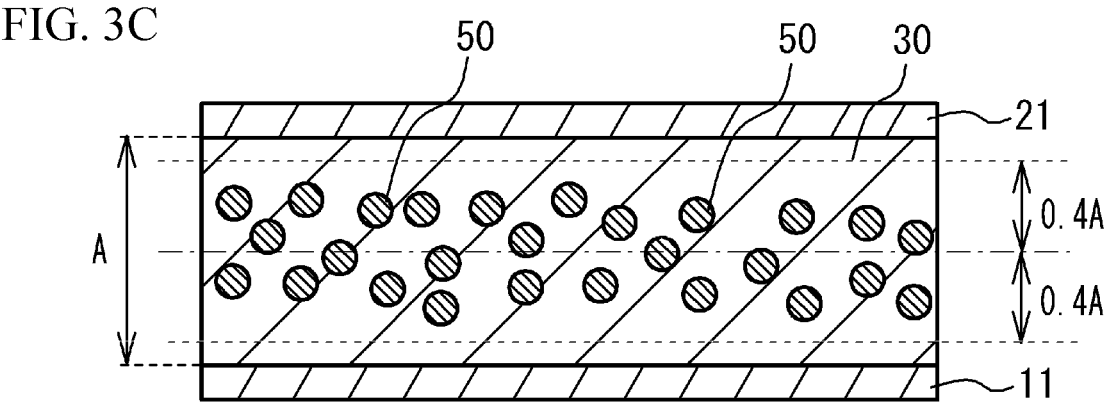

FIG. 3A to FIG. 3C illustrate schematic cross sectional view of the solid electrolyte layer 30 and the first internal electrode layer 11 adjacent to the solid electrolyte layer 30, and the second internal electrode layer 21 adjacent to the solid electrolyte layer 30. For example, as illustrated in FIG. 3A, when "M" diffuses, crystal grains 50 of MO$_2$ may exist around the interface between the solid electrolyte layer 30 and the first internal electrode layer 11 and the interface between the solid electrolyte layer 30 and the second internal electrode layer 21. In this case, MO$_2$ is not an ionic conductive material, an interface resistance between the solid electrolyte layer 30 and the first internal electrode layer 11 and an interface resistance between the solid electrolyte layer 30 and the second internal electrode layer 21 may increase.

Next, as illustrated in FIG. 3B, there may be a case where "M" of the Li—Al-M-PO$_4$-based phosphoric acid salt excessively diffuse, and the crystal grain 50 does not exist in the solid electrolyte layer 30. In this case, the amount of M of the Li—Al-M-PO$_4$-based phosphoric acid salt becomes smaller, and the composition may fluctuate. In this case, the ionic conductivity of the solid electrolyte layer 30 may be degraded.

Therefore, the rate characteristic of the all solid battery 100 and the all solid battery 100a may be reduced, in both of the cases of FIG. 3A and FIG. 3B.

The all solid battery 100 and the all solid battery 100a have a structure for achieving high ionic conductivity. In concrete, a segregation range of MO$_2$ is unevenly distributed in a center portion in the thickness direction of the solid electrolyte layer 30. As illustrated in FIG. 3C, when the thickness of the solid electrolyte layer 30 is expressed by "A", the segregation range of MO$_2$ is unevenly distributed from the center in the thickness of the solid electrolyte layer 30 to 0.4 A downward and to 0.4 A upward. It is preferable that the segregation range of MO$_2$ is narrow. For example, it is preferable that the segregation range of MO$_2$ is unevenly distributed from the center in the thickness of the solid electrolyte layer 30 to 0.2 A downward and to 0.2 A upward. It is more preferable that the segregation range of MO$_2$ is unevenly distributed from the center in the thickness of the solid electrolyte layer 30 to 0.1 A downward and to 0.1 A upward. It is still more preferable that the segregation range of MO$_2$ is unevenly distributed from the center in the thickness of the solid electrolyte layer 30 to 0.025 A downward and to 0.025 A upward. When MO$_2$ is segregated, MO$_2$ does not exist in a structure of Li—Al-M-PO$_4$ but independently exits in the structure of MO$_2$ (crystal grains of MO$_2$) in which "P" does not exist. The segregation range of MO$_2$ is a range in which an existence ratio of MO$_2$ is 5% or more with respect to the Li—Al-M-PO$_4$-based base material. When the segregation range of MO$_2$ is unevenly distributed in the center portion, the segregation range of MO$_2$ exists in only the center portion and does not exist other region.

Figure 4:
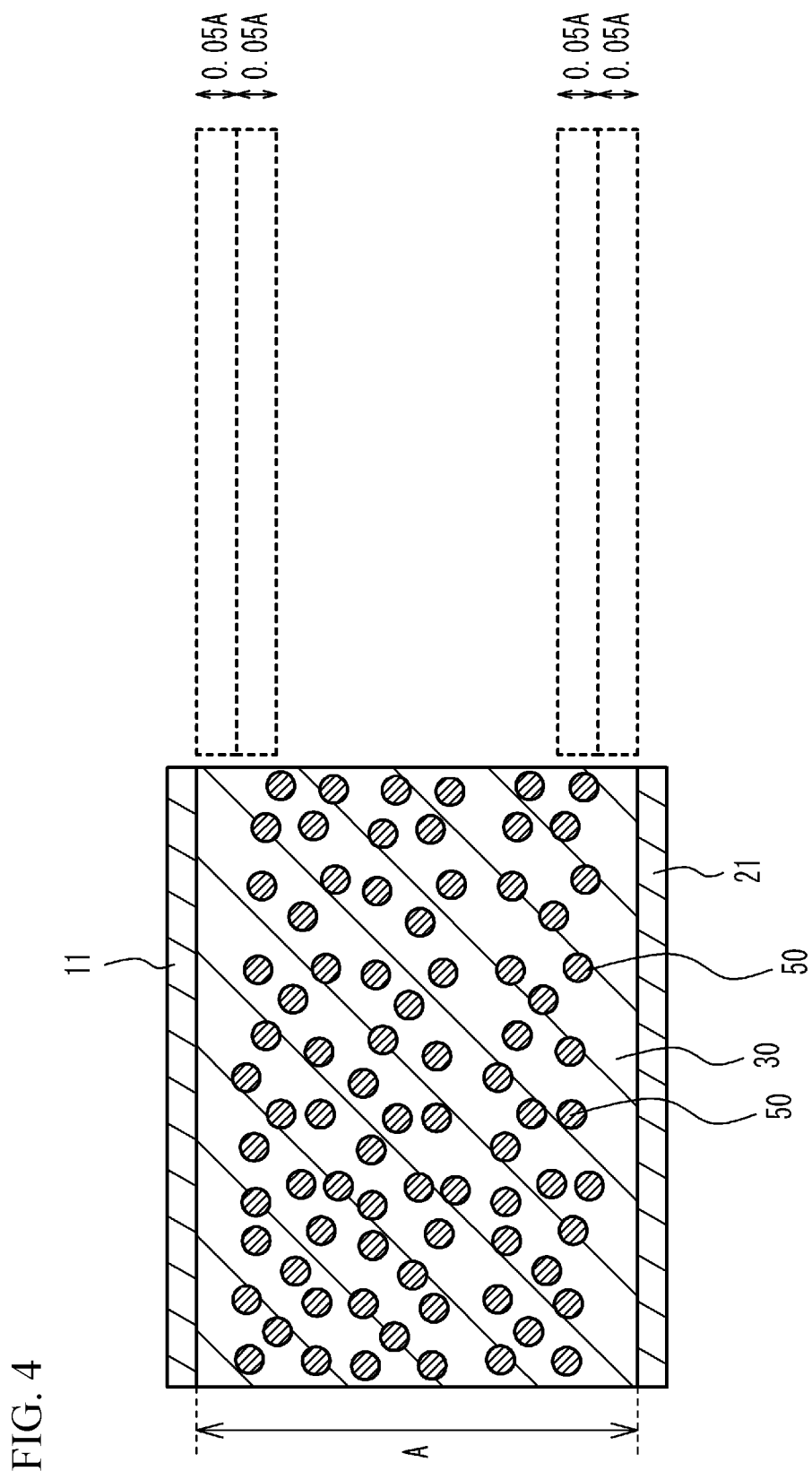
FIG. 4 illustrates a measuring method of a $MO_2$ segregation range.

It is possible to measure the segregation range of MO$_2$ by measuring an area where only "M" and O (oxygen) exist, by a ToF-SIMS and a SEM-EDS mapping analysis. For example, as illustrated in FIG. 4, the solid electrolyte layer 30 is divided into 20 rectangular strip shapes having a thickness of 0.05 A when the thickness of the solid electrolyte layer 30 is "A". Each area where only "M" and O (oxygen) exist is measured in each rectangular strip shape. Thus, it is possible to calculate an area ratio of MO$_2$ with respect to the Li—Al-M-PO$_4$-based base material.

In the embodiment the segregation range of MO$_2$ is unevenly distributed in a center portion of the solid electrolyte layer 30 in the thickness direction. Thus, it is possible to reduce the interface resistance between the solid electrolyte layer 30 and the first internal electrode layer 11 and the interface resistance between the solid electrolyte layer 30 and the second electrode layer 21. When the MO$_2$ exists in the solid electrolyte layer 30, lack of M in the Li—Al-M-PO$_4$ is suppressed. And the composition changing is suppressed. It is therefore possible to secure the ionic conductivity of the solid electrolyte layer 30. Accordingly, it is possible to achieve high ionic conductivity.

When the crystal grain diameter of the crystal grain 50 not having ionic conductivity is large, ionic conductive paths are hardly secured. It is therefore preferable that an average crystal grain diameter of the crystal grains 50 has an upper limit. For example, it is preferable that the average crystal grain diameter of the crystal grains 50 is 5 μm or less. It is more preferable that the average crystal grain diameter is 2 μm or less. On the other hand, when the crystal grain diameter of the crystal grains 50 is small, probability of prevention of ion movement gets larger. It is therefore preferable that the average crystal grain diameter of the crystal grains 50 has a lower limit. For example, it is preferable that the average crystal grain diameter of the crystal grains 50 is 0.2 μm or more. It is more preferable that the average crystal grain diameter is 0.5 μm or more.

When the thickness of the solid electrolyte layer 30 is small, the ionic conductive path may be short. It is therefore preferable that the thickness of the solid electrolyte layer 30 has an upper limit. For example, the thickness of the solid electrolyte layer 30 is, 30 μm or less, 15 μm or less, or 10 μm or less. On the other hand, when the thickness of the solid electrolyte layer 30 is small, short between electrodes may occur. It is therefore preferable that the thickness of the solid electrolyte layer 30 is 2 μm or more. It is preferable that the average grain diameter of the crystal grains 50 is within "the thickness of the solid electrolyte layer 30×0.1±20%".

Figure 5:
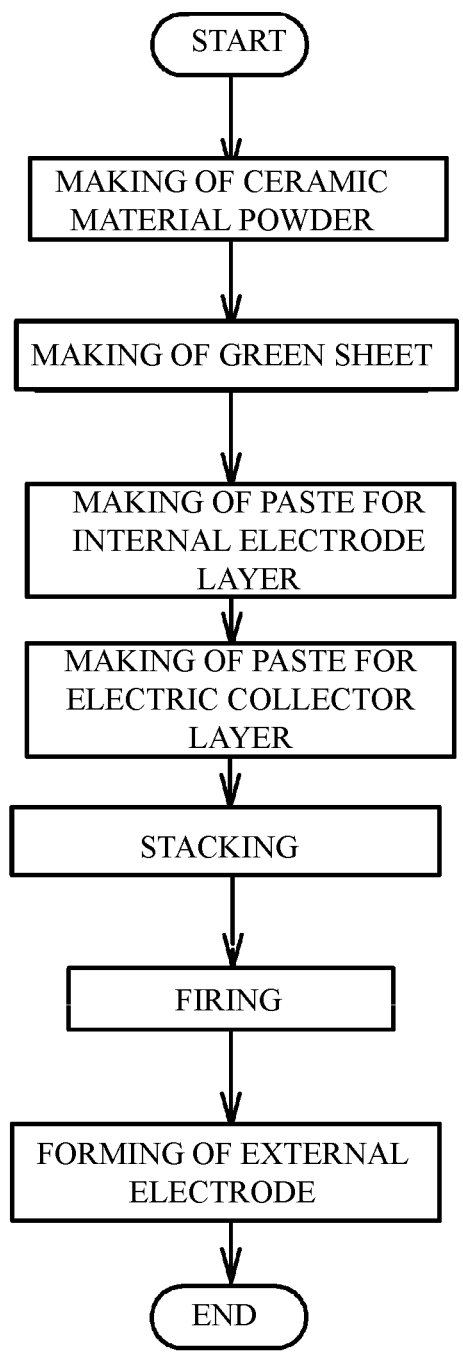
FIG. 5 illustrates a flowchart of a manufacturing method of an all solid battery.

FIG. 5 illustrates a flowchart of the manufacturing method of the all solid battery 100a.

(Making process of ceramic material powder) Powder of oxide-based solid electrolyte for the solid electrolyte layer 30 is made. In concrete, Li—Al-M-PO$_4$-based phosphoric acid salt is made. For example, it is possible to make the solid electrolyte powder, by mixing raw material and additives and using solid phase synthesis method or the like. The resulting powder is subjected to dry grinding. Thus, a grain diameter of the resulting power is adjusted to a desired one. For example, it is possible to adjust the grain diameter to the desired diameter with use of planetary ball mill using ZrO$_2$ ball of 5 mm ϕ.

The additive includes sintering assistant. The sintering assistant includes one or more of glass components such as Li—B—O-based compound, Li—Si—O-based compound, Li—C—O-based compound, Li—S—O-based compound and Li—P—O-based compound.

(Making process of green sheet) The resulting powder is evenly dispersed into aqueous solvent or organic solvent together with a binding agent, a dispersing agent, a plasticizer and so on. The resulting powder is subjected wet crushing. And solid electrolyte slurry having a desired particle diameter is obtained. In this case, a bead mill, a wet jet mill, a kneader, a high pressure homogenizer or the like may be used. It is preferable that the bead mill is used because adjusting of particle size distribution and dispersion are performed at the same time. A binder is added to the resulting solid electrolyte slurry. Thus, solid electrolyte paste is obtained. The solid electrolyte paste is painted. Thus, a green sheet is obtained. The painting method is not limited. For example, a slot die method, a reverse coat method, a gravure coat method, a bar coat method, a doctor blade method or the like may be used. It is possible to measure the particle size distribution after the wet-crushing, by using a laser diffraction measurement device using a laser diffraction scattering method.

In the making of the green sheet, the crystal grains 50 of $MO_2$ are arranged in the center portion of the green sheet in the thickness direction. For example, the crystal grains 50 having the average particle diameter of 0.2 μm or more and 5 μm or less. For example, the crystal grains 50 are arranged in only a range from the center in the thickness of the green sheet to 0.4 A downward and to 0.4 A upward, when the thickness of the green sheet is expressed by "A". It is preferable that the range in the thickness direction is narrow. For example, it is preferable that the range is a range from the center in the thickness of the green sheet to 0.2 A downward and to 0.2 A upward. It is more preferable that the range is a range from the center in the thickness of the green sheet to 0.1 A downward and to 0.1 A upward. It is still more preferable that the range is a range from the center in the thickness of the green sheet to 0.025 A downward and to 0.025 A upward (Making process of paste for internal electrode) Next, paste for internal electrode is made in order to make the first internal electrode layer 11 and the second internal electrode layer 21. For example, a conductive auxiliary agent, an active material, a solid electrolyte material, a binder, a plasticizer and so on are evenly dispersed into water or organic solvent. Thus, paste for internal electrode layer is obtained. The above-mentioned solid electrolyte paste may be used as the solid electrolyte material. Pd, Ni, Cu, Fe, or alloy thereof, or a carbon material may be used as the conductive auxiliary agent. When the composition of the first internal electrode layer 11 is different from that of the second internal electrode layer 21, paste for internal electrode used for the first internal electrode layer 11 and another paste for internal electrode used for the second internal electrode layer 21 may be individually made.

(Making process of paste for electric collector) Next, paste for electric collector is made in order to make the first electric collector layer 12 and the second electric collector layer 22. It is possible to make the paste for electric collector, by evenly dispersing Pd powder, carbon black, board-shaped graphite carbon, a binder, dispersant, plasticizer and so on into water or organic solvent.

Figure 6:
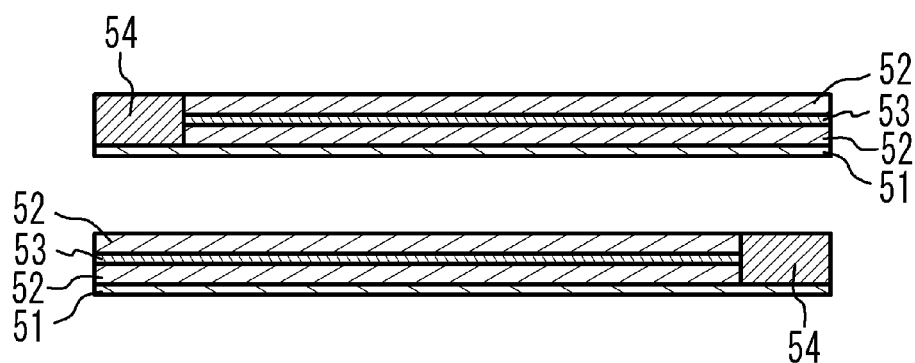
FIG. 6 illustrates a stacking process.

(Stacking process) Paste 52 for internal electrode is printed on one face of a green sheet 51 as illustrated in FIG. 6. Paste 53 for electric collector is printed on the paste 52 for electrode layer. And, another paste 52 for internal electrode is printed on the paste 53 for electric collector. A reverse pattern 54 is printed on a part of the green sheet 51 where neither the paste 52 for electrode layer nor the paste 53 for electric collector is printed. A material of the reverse pattern 54 may be the same as that of the green sheet 51. The green sheets 51 after printing are stacked so that each of the green sheets 51 is alternately shifted to each other. Thus, a multilayer structure is obtained. In this case, the multilayer structure is formed so that each of the combinations of the paste 52 for internal electrode and the paste 53 for electric collector is alternately exposed to each of two end faces, in the multilayer structure, (Firing process) Next, the multilayer structure is fired. In the firing process, it is preferable that a maximum temperature is 400 degrees C. to 1000 degrees C. in oxidizing atmosphere or non-oxidizing atmosphere. It is more preferable that that maximum temperature is 500 degrees C. to 900 degrees C. In order to sufficiently remove the binder until the maximum temperature, a process for keeping a temperature lower than the maximum temperature in oxidizing atmosphere may be performed. It is preferable that the firing is performed in the lowest possible temperature, from a viewpoint of reduction of the process cost. After the firing, a re-oxidizing process may be performed. In this manner, the multilayer chip 60 is formed.

After that, metal paste is applied to the two end faces of the multilayer chip 60. And, the metal paste is fired. Thus, the first external electrode 40a and the second external electrode 40b are formed. Alternatively, the multilayer chip 60 may be put in a dedicated tool so that the first external electrode 40a is spaced from the second external electrode 40b on the upper face, the lower face and the two side faces connected to the two end faces. And, electrodes may be formed by a sputtering. The first external electrode 40a and the second external electrode 40b may be formed by plating on the formed electrodes.

In the embodiment, the green sheet 51 includes $MO_2$ particles. The firing condition of the firing process is adjusted. Thus, the segregation range of $MO_2$ is unevenly distributed from the center in the thickness of the solid electrolyte layer 30 to 0.4 A downward and to 0.4 A upward, when the thickness of the solid electrolyte layer 30 is expressed by "A". In this case, it is possible to reduce the interface resistance between the solid electrolyte layer 30 and the first internal electrode layer 11 and the interface resistance between the solid electrolyte layer 30 and the second internal electrode layer 21. When the $MO_2$ exists in the solid electrolyte layer 30, lack of M in the Li—Al-M-$PO_4$ is suppressed. And the composition changing is suppressed. It is therefore possible to secure the ionic conductivity of the solid electrolyte layer 30. Accordingly, it is possible to achieve high ionic conductivity. When the green sheet 51 excessively includes $MO_2$ particles, lack of "M" in the Li—Al-M-$PO_4$ is suppressed even if the firing process is performed at a high temperature (for example 600 degrees C. or more). That is, the firing process at a high temperature can be performed. In this case, sintering characteristic of the solid electrolyte layer 30 is favorable, and high ionic conductivity is achieved.

EXAMPLES

The all solid batteries in accordance with the embodiment were made and the property was measured.

(Examples 1 to 4 and Comparative examples 1 to 3) $Co_3O_4$, $Li_2CO_3$, dihydrogen phosphate ammonium, $Al_2O_3$, GeO$_2$ were mixed and were used as solid electrolyte material powder. From the solid electrolyte material powder, Li$_{1.3}$Al$_{0.3}$Ge$_{1.7}$(PO$_4$)$_3$ including a predetermined amount of Co was made by a solid phase synthesizing. The resulting power was crushed. Thus, solid electrolyte slurry was made. Solid electrolyte paste was obtained by adding a binder to the resulting slurry. And, solid electrolyte green sheet was made. Li$_{1.3}$Al$_{0.3}$Ti$_{1.7}$(PO$_4$)$_3$ including a predetermined amount of LiCoPO$_4$ and Co was synthesized by a solid phase synthesizing as well as the above-mentioned oxide. Thus, the paste for internal electrode was made.

Paste for internal electrode having a thickness of 2 μm was printed on the solid electrolyte green sheet, with use of a screen having a predetermined pattern. And, paste for electric collector was printed on the paste for internal electrode. And, paste for internal electrode having a thickness of 2 μm was printed on the paste for electric collector. 11 numbers of the green sheets after the printing were stacked so that each of the electrodes is alternately shifted to right and left. Cover sheets having an average thickness of 30 μm in which solid electrolyte green sheets were stacked were adhered to an upper face and a lower face of the multilayer structure of the stacked green sheets after the printing. The cover sheets were crimped to the multilayer structure by a heating pressurizing press. The resulting multilayer structure was stamped into a predetermined size by a dicer.

The binder was removed from the chip after cutting by a thermal treatment in a temperature range of 300 degrees C. to 500 degrees C. After that, the chip was sintered by a thermal treatment of 900 degrees C. or less. Thus, a sintered structure was made. A cross section of the sintered structure was observed with use of SEM. The thickness of the solid electrolyte layer 30 was measured. With respect to the examples 1 and 2 and the comparative examples 1 and 2, the thickness of the solid electrolyte layer 30 was 10 μm. The thickness of the solid electrolyte layer 30 was 20 μm, with respect to the examples 3 and 4 and the comparative example 3.

An area where only Ge and O (oxygen) exist was measured by a ToF-SIMS and a SEM-EDS mapping analysis. Thus, the segregation range of MO$_2$ was measured. In concrete, as illustrated in FIG. 4, the solid electrolyte layer 30 was divided into 20 rectangular strip shapes having a thickness of 0.05 A when the thickness of the solid electrolyte layer 30 is expressed by "A". With respect to each of rectangular strip shapes, each area ratio of MO$_2$ with respect to the Li—Al-M-PO$_4$-based phosphoric acid salt base material was calculated. A range in which an existence ratio of MO$_2$ is 5% or more with respect to the Li—Al-M-PO$_4$-based base material was defined as the segregation range. Table 1 shows the results.

Next, with respect to the examples 1 to 4 and the comparative examples 1 to 3, ionic conductivity was measured. As a measuring apparatus, a frequency response analyzer 1255B made by Solartron was used. The temperature was 25 degrees C. Measured frequency range was 500000 Hz to 0.1 Hz. When the measured ionic conductivity was 5×10$^{-5}$ S/cm or more, the ionic conductivity of the base material was determined as good "◯". When the ionic conductivity was less than 5×10$^{-5}$ S/cm, the ionic conductivity of the base material was determined as bad "x".

TABLE 1

| | THICKNESS (μm) | GeO$_2$ SEGREGATION RANGE | AMOUNT OF GeO$_2$ NEAR INTERFACE | IONIC CONDUCTIVITY OF BASE MATERIAL | TOTAL EVALUATION |
|---|---|---|---|---|---|
| EXAMPLE 1 | 10 | 0.25 A | ◯ | ◯ | ◯ |
| EXAMPLE 2 | 10 | 0.05 A | ◯ | ◯ | ◯ |
| EXAMPLE 3 | 20 | 0.25 A | ◯ | ◯ | ◯ |
| EXAMPLE 4 | 20 | 0.025 A | ◯ | ◯ | ◯ |
| COMPARATIVE EXAMPLE 1 | 10 | 0.45 A | X | ◯ | X |
| COMPARATIVE EXAMPLE 2 | 10 | 0 | ◯ | X | X |
| COMPARATIVE EXAMPLE 3 | 20 | 0.45 A | X | ◯ | X |
| COMPARATIVE EXAMPLE 4 | 20 | 0 | ◯ | X | X |

In the example 1, when the thickness of the solid electrolyte layer 30 is expressed by "A", the segregation range of MO$_2$ was unevenly distributed from the center in the thickness of the solid electrolyte layer 30 to 0.25 A downward and to 0.25 A upward. In the example 2, the segregation range of MO$_2$ was unevenly distributed from the center in the thickness of the solid electrolyte layer 30 to 0.05 A downward and to 0.05 A upward. In the example 3, the segregation range of MO$_2$ was unevenly distributed from the center in the thickness of the solid electrolyte layer 30 to 0.25 A downward and to 0.25 A upward. In the example 4, the segregation range of MO$_2$ was unevenly distributed from the center in the thickness of the solid electrolyte layer 30 to 0.025 A downward and to 0.025 A upward. In the comparative example 1, the segregation range of MO$_2$ was unevenly distributed from the center in the thickness of the solid electrolyte layer 30 to 0.45 A downward and to 0.45 A upward. In the comparative example 2, MO$_2$ was not unevenly distributed. In the comparative example 3, the segregation range of MO$_2$ was unevenly distributed from the center in the thickness of the solid electrolyte layer 30 to 0.45 A downward and to 0.45 A upward. In the comparative example 4, MO$_2$ was not unevenly distributed.

When the total of the segregation range of MO$_2$ is 0.8 A or less, the amount of GeO$_2$ near the interface of Table 1 was determined as good "◯". When the total of the segregation range of MO$_2$ is more than 0.8 A, the amount of GeO$_2$ near the interface of Table 1 was determined as bad "x". In the comparative examples 2 and 4, GeO$_2$ was not unevenly distributed. Therefore, the amount of GeO$_2$ near the interface of Table 1 was determined as good "◯". When the amount of GeO$_2$ near the interface was determined as good, ion conductive paths near the interface can be secured. On the other hand, the amount of GeO$_2$ near the interface was determined as bad, the number of ion conductive paths near the interface is small.

With respect to the examples 1 to 4 and the comparative examples 1 and 3, the ionic conductivity of the base material was determined as good "◯". It is thought that this was because the crystal grains of GeO$_2$ existed in the solid electrolyte layers 30, the reduction amount of Ge from the Li—Al—Ge—PO$_4$-based phosphoric acid salt was small, and the ionic conductivity was secured. On the other hand, with respect to the comparative examples 2 and 3, the ionic conductivity of the base material was determined as bad "x".

It is thought that this was because $GeO_2$ did not exist in the solid electrolyte layers 30, the reduction amount of Ge from the Li—Al—Ge—$PO_4$-based phosphoric acid salt base material was large, and the ionic conductivity was degraded.

When the amount of $GeO_2$ near the interface and the ionic conductivity of the base material were determined as good, the total evaluation of Table 1 was determined as good "○". When at least one of the amount of $GeO_2$ near the interface and the ionic conductivity of the base material was determined as bad, the total evaluation was determined as bad "x".

Although the embodiments of the present invention have been described in detail, it is to be understood that the various change, substitutions, and alterations could be made hereto without departing from the spirit and scope of the invention.

What is claimed is:

1. An all solid battery comprising:
   a solid electrolyte layer of which a main component is a Li—Al-M-$PO_4$-based phosphoric acid salt;
   a first electrode layer that is provided on a first main face of the solid electrolyte layer and includes an active material; and
   a second electrode layer that is provided on a second main face of the solid electrolyte layer and includes an active material,
   wherein "M" is at least one of Ge, Ti, and Zr,
   wherein a region in which a ratio of $MO_2$ with respect to Li—Al-M-$PO_4$ is 5% or more is unevenly distributed from a center in a thickness of the solid electrolyte layer to 0.4 A downward and to 0.4 A upward, when the thickness of the solid electrolyte layer is expressed by "A".

2. The all solid battery as claimed in claim 1, wherein an average crystal grain diameter of the $MO_2$ is 0.2 μm or more and 5 μm or less in the solid electrolyte layer.

3. The all solid battery as claimed in claim 1, wherein "M" is Ge.

4. A manufacturing method of an all solid battery comprising:
   preparing a multilayer structure in which a paste for a first electrode layer including an active material is provided on a first main face of a green sheet including Li—Al-M-$PO_4$-based phosphoric acid salt powder, and a paste for a second electrode layer including an active material is provided on a second main face of the green sheet; and
   firing the multilayer structure,
   wherein "M" is at least one of Ge, Ti and Zr,
   wherein a region in which a ratio of $MO_2$ with respect to Li—Al-M-$PO_4$ is 5% or more is unevenly distributed from a center in a thickness of a solid electrolyte layer formed by firing the green sheet to 0.4 A downward and to 0.4 A upward when the thickness of the solid electrolyte layer is expressed by "A", by adding $MO_2$ particles in the green sheet and adjusting a condition of the firing.

* * * * *